United States Patent
Liff et al.

(10) Patent No.: US 12,363,610 B2
(45) Date of Patent: Jul. 15, 2025

(54) BEACON-BASED INTEGRATED SECURITY MONITORING

(71) Applicant: Sennco Solutions, Inc., Plainfield, IL (US)

(72) Inventors: Dale R. Liff, Montgomery, IL (US); Brian Peacock, Melbourne, FL (US); Stephen Strom, North Olmsted, OH (US); Christopher Marszalek, Plainfield, IL (US); Elmer Huebner, II, Aurora, IL (US)

(73) Assignee: SENNCO SOLUTIONS, INC., Plainfield, IL (US)

( * ) Notice: Subject to any disclaimer, the term of this patent is extended or adjusted under 35 U.S.C. 154(b) by 351 days.

(21) Appl. No.: 17/393,038

(22) Filed: Aug. 3, 2021

(65) Prior Publication Data
US 2023/0042066 A1 Feb. 9, 2023

(51) Int. Cl.
*H04W 40/24* (2009.01)
*H04W 12/04* (2021.01)
*H04W 12/63* (2021.01)
*H04W 12/65* (2021.01)

(52) U.S. Cl.
CPC ......... *H04W 40/244* (2013.01); *H04W 12/04* (2013.01); *H04W 12/63* (2021.01); *H04W 12/65* (2021.01)

(58) Field of Classification Search
CPC ... H04W 40/244; H04W 12/63; H04W 12/65; H04W 12/04
See application file for complete search history.

(56) References Cited

U.S. PATENT DOCUMENTS

| | | | |
|---|---|---|---|
| 6,745,036 B1* | 6/2004 | Dunne | G01S 5/00 455/456.3 |
| 8,140,012 B1 | 3/2012 | Causey et al. | |
| 9,437,088 B2* | 9/2016 | Phillips | G08B 13/1409 |
| 11,238,185 B2 | 2/2022 | Peacock et al. | |
| 2011/0063113 A1* | 3/2011 | Hook | G01S 13/82 340/572.1 |
| 2015/0304484 A1* | 10/2015 | Halmstad | H04W 48/02 455/419 |
| 2018/0137729 A1* | 5/2018 | Bottazzi | G08B 13/2462 |
| 2018/0260587 A1 | 9/2018 | Peacock | |
| 2018/0349651 A1 | 12/2018 | Snediker et al. | |

(Continued)

OTHER PUBLICATIONS

What is a bluetooth BEACON? How Do BLE Beacons work? Beaconstac; https://www.beaconstac.com/what-is-a-bluetooth-beacon; 2019; 10 pp.

(Continued)

*Primary Examiner* — Elton Williams
(74) *Attorney, Agent, or Firm* — LEMPIA SUMMERFIELD KATZ LLC

(57) ABSTRACT

An electronic device configured for retail display includes an antenna, a memory in which security monitoring instructions are stored, and a processor configured to execute the security monitoring instructions to monitor a profile of wireless beacon devices detected via the antenna. The processor is further configured via the execution of the security monitoring instructions to, upon detection of a profile of wireless beacon devices that exceeds a threshold, initiate a security measure for the electronic device.

19 Claims, 4 Drawing Sheets

(56) References Cited

U.S. PATENT DOCUMENTS

2021/0334925 A1    10/2021   Peacock et al.
2022/0156413 A1     5/2022   Peacock et al.

OTHER PUBLICATIONS

International Search Report and Written Opinion cited in the corresponding international application No. PCT/US2022/038768; Dec. 13, 2022; 10 pp.

International Preliminary Report on Patentability of International Bureau cited in the corresponding international application No. PCT/US2022/038768; Feb. 6, 2024; 9 pp.

European Search Report of the European Patent Office cited in corresponding European patent application No. 22853734.6; Jan. 16, 2025; 10 pp.

\* cited by examiner

BEACON-BASED INTEGRATED SECURITY MONITORING

BACKGROUND OF THE DISCLOSURE

Field of the Disclosure

The disclosure relates generally to security monitoring of electronic merchandise on display.

Brief Description of Related Technology

Product merchandise is routinely displayed in retail environments with a security mechanism to deter theft. In some cases, the security mechanism is a tether that ties the merchandise to a display fixture. In other cases, the security mechanism is a security device, such as an electronic tag, affixed to the product and configured to support a proximity detection scheme. In either case, the security mechanism attempts to deter theft while providing a consumer an opportunity to evaluate the product. For instance, the security device may allow the consumer to lift or otherwise inspect the product to assess its function and/or aesthetics. Allowing the consumer to lift the product gives the consumer a better opportunity to assess the weight and feel of the product, as well as interact with the various features and other aspects of the product. Despite allowing for such interaction, security devices and other security mechanisms may nonetheless undesirably restrict or inhibit consumer evaluation of the merchandise.

SUMMARY OF THE DISCLOSURE

In accordance with one aspect of the disclosure, an electronic device configured for retail display includes an antenna, a memory in which security monitoring instructions are stored, and a processor configured to execute the security monitoring instructions to monitor a profile of wireless beacon devices detected via the antenna. The processor is further configured via the execution of the security monitoring instructions to, upon detection of a profile of wireless beacon devices that exceeds a threshold, initiate a security measure for the electronic device.

In accordance with another aspect of the disclosure, a method of monitoring an electronic device on retail display includes monitoring, by a processor, a plurality of wireless beacon devices, each wireless beacon device of the plurality of wireless beacon devices broadcasting a beacon signal detected via an antenna of the electronic device. The method further includes generating, by the processor, a profile based on the beacon signals of the plurality of wireless beacon devices detected via the antenna, and initiating, by the processor, a security measure for the electronic device based on an analysis of the profile.

In accordance with another aspect of the disclosure, a system for retail security monitoring includes an electronic device on retail display, and a plurality of wireless beacon devices, each wireless beacon device of the plurality of wireless beacon devices broadcasting a respective signal at regular time intervals. The electronic device includes an antenna, a memory in which security monitoring instructions are stored, and a processor configured to execute the security monitoring instructions to monitor a profile of the plurality of wireless beacon devices detected via the antenna. The processor is further configured via the execution of the security monitoring instructions to, upon detection of a change in the profile of the plurality of wireless beacon devices that exceeds a threshold, lock a user interface of the electronic device.

In connection with any one of the aforementioned aspects, the devices, methods, and systems described herein may alternatively or additionally include any combination of one or more of the following aspects or features. The processor is further configured via the execution of the security monitoring instructions to periodically capture current profile data for the profile of wireless beacon devices detected via the antenna. The profile includes data indicative of quantities of wireless beacon devices detected, types of wireless beacon devices detected, and signal strengths of wireless beacon devices detected via the antenna. The types of wireless beacon devices are indicative of locations of the wireless beacon devices. The locations of the wireless beacon devices include locations relative to a location associated with an exit of a retail environment. The threshold includes predetermined signal strengths for a predetermined number and type of wireless beacon devices. The type of wireless beacon devices is indicative of a location of the wireless beacon devices. The processor is further configured via the execution of the security monitoring instructions to, upon the initiation of the security measure, dynamically change the threshold to another threshold and, upon detection of an updated profile of wireless beacon devices that exceeds the other threshold, initiate another security measure for the electronic device. The wireless beacon devices include wireless transmitters operable to broadcast data at regular time intervals. The wireless beacon devices are not connected to an external network. The wireless beacon devices not connected to an external network are battery powered. Base profile data for a home base location of the electronic device is stored in the memory. The home base location is a display location of the electronic device within a retail environment. The processor is further configured via the execution of the security monitoring instructions to, upon detection of power being supplied to the electronic device, implement a comparison of data indicative of the profile with the base profile data to detect whether the electronic device is at the home base location. The processor is further configured via the execution of the security monitoring instructions to, upon detection of power no longer being supplied to the electronic device, initiate another security measure for the electronic device. The processor is further configured to, upon an initial detection of the wireless beacon devices by the antenna, automatically install and store the security monitoring instructions in the memory. Exit profile data is stored in the memory. The exit profile data is indicative of wireless beacon devices disposed at a location associated with an exit of a retail environment. The processor is further configured via the execution of the security monitoring instructions to compare the profile with the exit profile data and, upon detection of a match between the profile and the exit profile data, lock a user interface of the electronic device. The profile includes data indicative of quantities of wireless beacon devices detected, types of wireless beacon devices detected, and signal strengths of wireless beacon devices detected via the antenna. The types of wireless beacon devices are indicative of locations of the wireless beacon devices relative to a location associated with an exit of a retail environment. The analysis includes comparing the profile to a threshold. The threshold includes predetermined signal strengths for a predetermined number and type of wireless beacon devices. The type of wireless beacon devices is indicative of a location of the wireless beacon devices within a retail environment. The method further includes, upon initiating the security measure, dynamically changing the threshold to another threshold, generating, by the processor, an updated profile based on updated beacon signals of the plurality of wireless beacon devices detected via the antenna, and initiating, by the processor, another security measure for the electronic device based on an analysis of the updated profile. The analysis of the profile includes detecting power being supplied to the electronic device, comparing the profile with base profile data for a home base location of the electronic device, the home base location being a display location of the electronic device within a retail environment, and determining whether the electronic device is at the home base location based on the comparison. The analysis of the profile further includes, upon detection of power no longer being supplied to the electronic device, initiating an initial security measure for the electronic device.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
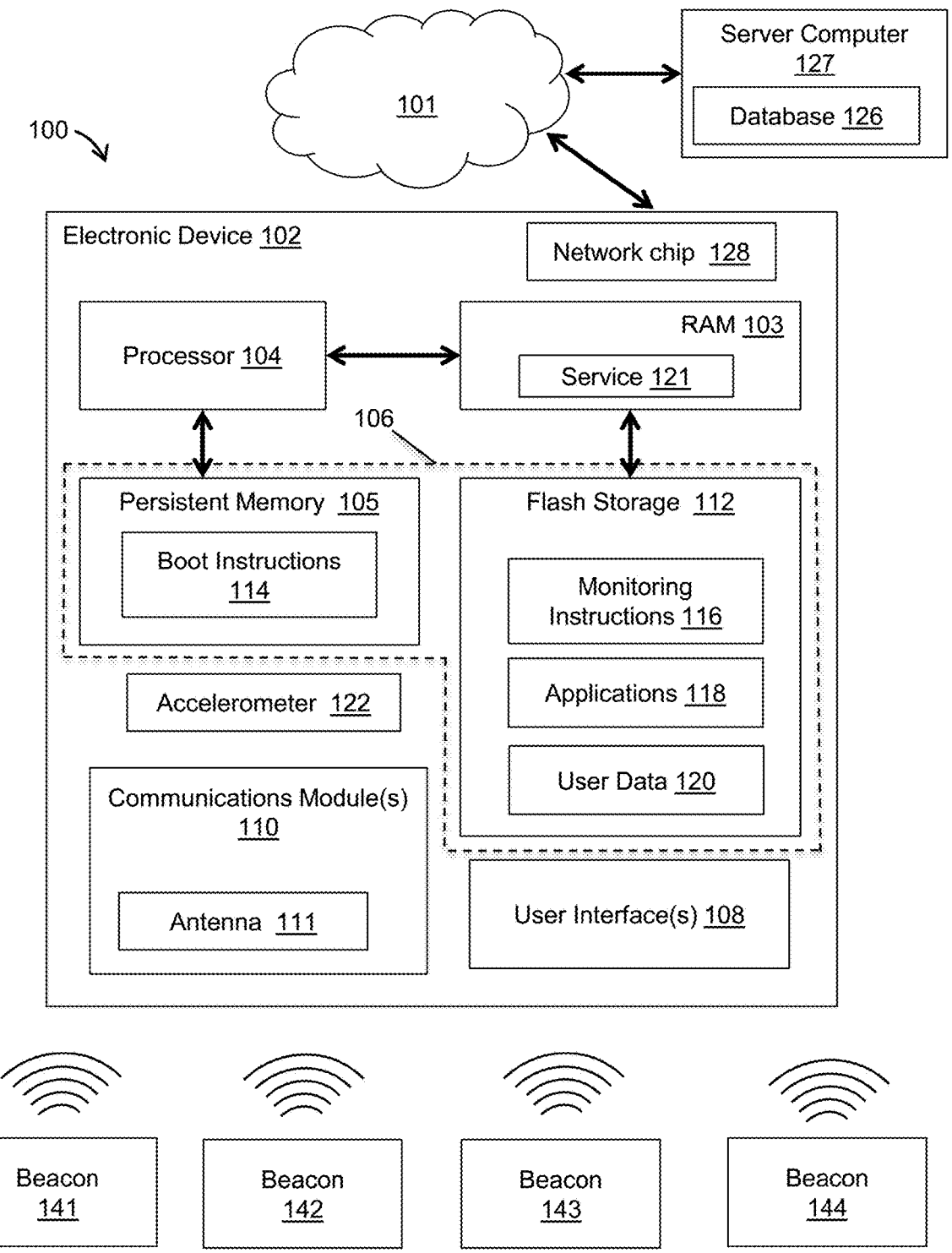
FIG. 1 is a block diagram of an electronic device configured for retail display while providing integrated security monitoring based on beacon detection in accordance with one example.

The disclosed devices, methods, and systems are susceptible of embodiments in various forms. Specific embodiments of the invention are illustrated in the drawing (and will hereafter be described) with the understanding that the disclosure is intended to be illustrative, and is not intended to limit the invention to the specific embodiments described and illustrated herein.

DETAILED DESCRIPTION OF THE DISCLOSURE

Systems, devices and methods for security monitoring merchandise on display are described. The merchandise is or includes an electronic device. The security monitoring methods are implemented by the electronic device itself. The security monitoring is thus provided in a manner integrated with the electronic device on display. The retail environment may consequently not need to rely on tethers, security tags, proximity sensors, or other security mechanisms to deter theft. Alternatively, the integrated security monitoring provided by the disclosed systems, devices and methods may be used in conjunction with such other security mechanisms. Using the device itself to implement the security monitoring avoids having to rely on communications with a remote unit, such as a server computer or other networked computing device. Theft attempts may thus be met with an immediate response in real-time, e.g., a bricking or other locking (i.e., benefit denial), thereby deterring the theft attempt, e.g., before the electronic device leaves the retail site.

The disclosed systems, devices and methods may provide persistent security monitoring, avoiding the limitations of other integrated monitoring techniques. Integrated security monitoring presents a technical problem or challenge involving how to continue or sustain the implementation of the security monitoring if a user attempts to disable, shutdown, or otherwise discontinue the security monitoring. For instance, a user attempting to steal the electronic merchandise may close an application providing security monitoring, shutdown the electronic device, or perform a factory reset of the electronic device. The disclosed systems, devices and methods provide a technical solution(s) to this technical problem. In one aspect, the installation and storage of the security monitoring instructions (i.e., software solution) in memory is automatically performed upon an initial detection of a signal from a particular wireless transmitter, or beacon. In another aspect, the execution of security monitoring instructions is initiated via execution of boot instructions during a boot (e.g., startup) sequence. The boot instructions may be stored on or in a persistent memory (e.g., as firmware) of the electronic device. In another aspect, the security monitoring instructions may be executed within a background service running on a processor of the electronic device, rather than, for instance, as an application running in the foreground or otherwise accessible to the user via a user interface. The background service may be a persistent service, such as an Android Persistent Service (APS).

Other technical problems and challenges presented by integrated security monitoring are addressed by the disclosed systems, devices and methods. For instance, the amount of space available in persistent memory may be limited. The disclosed devices, methods and systems may conserve space in the persistent memory by configuring the boot instructions to initiate security monitoring instructions stored elsewhere on the electronic device. For instance, the security monitoring instructions may be stored on or in a storage device, such as a flash storage device. In some cases, the security monitoring instructions define an agent that implements one or more security monitoring procedures. The boot instructions may cause the agent to be attached to a persistent or other background service without having to store all of the instructions for the agent in persistent memory.

Yet another example of a technical problem or challenge addressed by the disclosed devices, systems and methods involves the temporary nature of the security monitoring. As merchandise for sale, the electronic device will eventually cease to be on display. The security monitoring of the disclosed systems, devices and methods should no longer be implemented once the electronic device is sold or otherwise transferred. The disclosed devices, systems and methods are capable of discontinuing the security monitoring despite the steps taken to establish persistent security monitoring. To that end, the boot instructions are configured to determine whether to initiate the security monitoring and the security monitoring instructions may be removed from the device upon sale of the device. In some cases, the determination includes querying a remote database, a networked device (e.g., a server computer), or other offsite device. Other techniques for obtaining data indicative of whether the security monitoring should be implemented or discontinued may be used, including, for instance, connection of, or other local communication with, a local device. Following the determination that security monitoring should be discontinued, the boot instructions may also provide an operator, such as a store clerk, with an opportunity to download a firmware or other update to the electronic device to remove or otherwise permanently deactivate the boot instructions relating to the security monitoring. In another example, device policy control software that is auto-provisioned via auto-enrollment services may be removed either by changing an Enterprise Mobile Management (EMM) profile associated with a device to remove content that gets loaded after a reset or by un-enrolling devices from the EMM, both of which then followed by resetting the device.

In one example, the disclosed systems, devices and methods provide for deploying multiple battery-powered beacon devices inside a retail environment that transmit specific signals or messages periodically. These periodic signals or messages are scanned by antennas of electronic merchandise such as phones or tablets and detected by the disclosed device policy control software running on the electronic merchandise for the purpose of determining where the electronic merchandise is located. Different actions may be triggered based on the locations of the electronic merchandise. Wi-Fi visibility and Geofence monitoring may be used as additional security backup layers. The electronic merchandise may be displayed with no hardware, sensors, cables, or tethers attached and be sitting on a wireless charger for the best tetherless customer shopping experience. In one example, when the electronic merchandise is picked up, the shopper may be immediately notified (i.e., in real-time) by a temporary alert on the device screen that the device is protected by a particular security protocol and at that point the shopper may roam inside the store with the device. If the device gets too close to an exit and/or leaves the store, the disclosed logic can immediately trigger additional warnings or local device locking (i.e., bricking) as well as optional audible alarms that do not require an internet connection, all in real-time to provide a more immediate theft deterrence. The disclosed software and logic may also allow for the disclosed devices to send data out to a back-end database or sever to provide additional analytics and system status as described below.

The disclosed systems, devices and methods are not limited to any particular type of electronic merchandise or type of retail environment or site. The integrated nature of the disclosed systems, devices and methods allows the nature of the retail environment to vary considerably. For instance, the retail site may be a kiosk rather than a stand-alone store with a dedicated entrance or exit. The nature of the electronic merchandise may also vary considerably. While the disclosed systems, devices and methods may be useful in connection with smartphones and other portable electronic devices, the electronic devices may or may not be handheld or portable. For instance, the disclosed systems, devices and methods may be useful in connection with televisions and other large-scale devices having an antenna, or with stationary point of sale devices.

Turning to the drawing figures, FIG. 1 depicts a system 100 for retail security monitoring based on monitoring wireless beacon visibility or detectability in accordance with one example. The system 100 includes an electronic device 102 on retail display. The system 100 also includes a plurality of wireless beacon devices 141-144. Each wireless beacon device 141-144 broadcasts a respective signal at regular time intervals. The system 100 is configured to protect the electronic device 102 from theft via detection of a trigger event related to the wireless beacon detectability. The system 100 may be configured in one or more ways. For instance, the system 100 and/or the electronic device 102 may be configured to monitor a profile of the wireless beacon devices detected via an antenna of the electronic device 102. In another example, the system 100 and/or the electronic device 102 may be configured to monitor one or more other aspects of the retail environment for one or more other trigger events. Detected trigger events may lead to the implementation of security measures, such as, for example, locking the electronic device 102.

The electronic device 102 of FIG. 1 is configured for retail display. The electronic device 102 may be merchandise for sale and/or part of an exhibit or other display of items for sale. For example, the electronic device 102 may be a smartphone, tablet, or laptop computer. The electronic device 102 may or may not be considered to be or include a computer or computing device. For instance, the electronic device 102 may be a television or monitor. The size, form factor, and other characteristics of the electronic device 102 may thus vary considerably. The electronic device 102 may also include a device that is not for sale. For example, the electronic device 102 may be an enterprise device such as employee handheld device (like Zebra Android devices, tablets, etc.), digital signage or registration device, Point of Sale (POS) tablet that is mounted to counter tops, or any other Consumer Electronic (CE) device used in retail or commercial settings.

The retail display may be in a store or other retail site or environment. One example of a retail site or environment is described below with respect to FIG. 2. The retail display may include one or more fixtures, such as display tables, a display stand, base, etc. The retail display and environment may have other security monitoring systems in operation to prevent or deter theft of the electronic device 102 and other merchandise on display. For instance, a wireless security system may be provided, such as the system described in U.S. Patent Publication No. 2016/0307415 ("Apparatus, System and Method for Monitoring a Device within a Zone"), the entire disclosure of which is hereby incorporated by reference. Alternatively or additionally, tethers or other cable-based security measures may be used, including, for instance, cable-based apparatus having a retractable reel and other components for securing merchandise to a display fixture as described in U.S. Patent Publication No. 2014/0059828 ("Apparatus, System and Method for Securing, Attaching and/or Detaching a Device to a Fixture"), the entire disclosure of which is hereby incorporated by reference.

The electronic device 102 may be configured to provide security monitoring for itself. Such self-monitoring may replace or augment the security measures established by other items in the retail environment. For instance, the self-monitoring may provide redundancy, which may be useful in circumstances in which a site system fails or is otherwise disabled, or when the cutting of a tether or cable is not detected.

The electronic device 102 includes a processor 104. The processor 104 executes instructions to implement security monitoring methods as described herein. The processor 104 may not be dedicated to implementing security-related tasks. In some cases, the processor 104 may be the primary processor of the electronic device 102. For instance, the processor 104 may be used to perform any number of non-security-related processing tasks or operations for the electronic device 102. In some cases, the processor 104 is or includes a central processing unit (CPU) or other general-purpose processing unit. For example, the processor 104 may be a microprocessor, microcontroller, programmable logic array (PLA), or field programmable gate array (FPGA). Alternatively or additionally, the processor 104 is or includes dedicated or specific processing functionality. For instance, the processor 104 may be or include a graphics processing unit (GPU), a digital signal processor (DSP), or other type of application-specific processor or processing unit. In some cases, the processor 104 is implemented as an application-specific integrated circuit (ASIC). The processor 104 may include one or more processing cores or other units integrated with one another to any extent. The processor 104 may be provided on one or more integrated circuits or integrated circuit (IC) chips. The processor 104 may be integrated with one or more other components of the electronic device 102, such as a memory 106 or a communications module 110. For example, in some cases, the processor 104 is a component of a system-on-a-chip (SoC).

The electronic device 102 includes one or more memory units on which instructions are stored. The instructions configure the processor 104 or otherwise cause the processor 104 to implement tasks or other operations. In the example of FIG. 1, the electronic device 102 includes a random-access memory (RAM) or other volatile memory 103 and a persistent memory 105. Both of the memories 103, 105 may be directly addressable and accessible by the processor 104 via, for instance, a memory bus. The persistent memory 105 may be read-only memory (ROM) or other non-volatile memory. Firmware for the electronic device 102 may be stored on the persistent memory 105. Each of the RAM 103 and the persistent memory 105 may include one or more memory units or memories (e.g., memory chips).

In the example of FIG. 1, the electronic device 102 includes one or more user interfaces 108 and one or more communication modules 110. The user interface 108 establishes the manner in which a user interacts or otherwise uses the electronic device 102. For instance, the user interface 108 may include a display, such as a touchscreen. Alternative or additional user interfaces may be provided, including, for instance, a keyboard, speaker, microphone, or other input/output device. The communication module 110 supports communications, such as wireless communications, with remote devices and/or an external network 101, such as the Internet. In some cases, the communication module 110 may include an antenna 111, a transceiver, and/or other components for supporting the communications. The communications may be in accordance with various communication protocols.

The electronic device 102 also includes a storage device 112. Data stored on the storage device 112 is not directly addressable by the processor 104, in contrast to the memories 103, 105. In the example shown, data on the storage device 112 is copied to the RAM 103 prior to use by the processor 104. The storage device 112 may be or include flash storage in the form of a solid-state drive (SSD). Alternatively or additionally, the storage device 112 is or includes a hard disk drive. The storage device 112 may include one or more storage devices. In one example, the storage device 112 and persistent memory 105 may be part of the same memory component 106. The configuration, construction, storage technology, and other characteristics of the storage device 112 may vary.

Boot instructions 114 are stored on the persistent memory 105. In some cases, the boot instructions 114 are stored as firmware of the electronic device 102. The firmware of the electronic device 102 may thus include the boot instructions 114 in some cases. The processor 104 is configured to execute the boot instructions 114 during a boot sequence of the electronic device 102. The boot sequence may be any startup sequence, including, for instance, a sequence implemented at a power cycle, power-on, factory or other reset, or other restart or startup. In some cases, the boot instructions 114 are implemented as a basic input/output system (BIOS) routine or a portion thereof. In other cases, the boot instructions 114 may be called by a BIOS routine as, for instance, a subroutine. But the boot instructions 114 are not limited to instructions set forth in, or called by, a BIOS routine. For example, the boot instructions 114 may be implemented in connection with a loading of an operating system for the electronic device 102.

Security monitoring functionality is provided via security monitoring instructions 116 stored on the storage device 112. In one example, the security monitoring functionality may be initiated via execution of the boot instructions 114 by the processor 104. The processor 104 is configured to execute the boot instructions 114 during the boot sequence to initiate execution of the security monitoring instructions 116. For example, the boot instructions 114 may include one or more subroutine or other calls or other references to the security monitoring instructions 116. The security monitoring functionality is thus initiated upon any rest or restart of the electronic device 100.

Initiation of the execution of the security monitoring instructions 116 at reset or startup is accomplished despite storage of the security monitoring instructions 116 outside of the persistent memory 105. The security monitoring instructions 116 may be stored in the storage device 112 alongside applications 118 and user data 120. The applications 118 may be or include applications installed on the electronic device 102. In some cases, the security monitoring instructions 116 may be stored as a standalone application. The user data 120 be or may include data generated by a user during use of the applications 118, including data generated as a result of execution of the security monitoring instructions 116.

The nature of the boot instructions 114 related to the security monitoring functionality may vary. The booting procedure of the electronic device 102, including the loading, execution, and maintenance of the security monitoring instructions 116 via the boot instructions 114, as well as executing the security monitoring instructions 116 based on processed retail data, are set forth in U.S. Patent Publication 2018/0260587 ("Integrated, persistent security monitoring of electronic merchandise"), the entire disclosure of which is hereby incorporated by reference.

In one example, the boot instructions 114 stored in the persistent memory 105 include a zero touch enrollment (ZTE) code, such as Google ZTE, or other enrollment services such as Samsung Knox, Apple DEP, or other custom EMM or Mobile Device Management (MDM) auto-enrollment services. These auto-enrollment services may be pre-installed by OEMs or by third-party partners prior to devices being shipped to distributors or retail channels. For instance, ZTE capability with an EMM back-end server may be used to implement persistence. When devices are enrolled into an EMM (either by serial numbers or International Mobile Equipment Identity (IMEI) numbers), when they first power up out of the box, or whenever they get factory reset, if they have a network connection they may check in with the EMM backend and download and install a profile that is setup for that device. The profile may include a DPC (Device Policy Controller) or locking agent and/or retail demo applications, boot scripts, other agents, or other applications that businesses and/or customers may want to be installed and run at bootup after a reset. In this case, the boot instructions 114 may never get removed. These auto-enrollment processes that happen at bootup are independent of the security monitoring instructions 116 which may be implemented inside the DPC and run automatically after the enrollment process. The security monitoring instructions 116 may be removed when a DPC is removed using one of the mechanisms described above. This may be the same case for any of the disclosed locking triggers—power loss, beacon scanning, Wi-Fi visibility, geofence, etc.

In another example, the security monitoring functionality may be initiated automatically when the antenna 111 of the electronic device 102 detects the wireless beacon devices 141-144. For example, as soon as the antenna 111 of the electronic device 102 detects a signal from a wireless beacon device 141-144 for the first time, the processor 104 is configured to automatically install and store the security monitoring instructions 116 in the memory, such as the flash storage 112. The security monitoring instructions 116 may also be stored in other memories, such as the persistent memory 105 or RAM 103. The processor 104 may be configured to access the external network 101, such as the Internet, or a server, such as server computer 127, to obtain the security monitoring instructions 116 for installation and storage. In this way, the processor 104 is further configured to, upon an initial detection of the wireless beacon devices 141-144 by the antenna 111, automatically install and store the security monitoring instructions 116 in the memory 105, 103. This "zero touch enrollment" process enables easy, out-of-the-box, scalable, persistent deployment of the disclosed security monitoring instructions 116.

Similar to the auto-enrollment services described above, beacon identifiers (described in more detail below), may be used to automatically assign predetermined demo policies to an electronic device 102 prior to activation, since beacon identifiers are unique to a location. For example, once an electronic device 102 reaches a certain retail location and is activated (or factory reset, etc.) at that location, the antenna 111 of the electronic device 102 detects the signal of the wireless beacon devices 141-144 (i.e., the device has "visibility" to beacon devices) and, based on the beacon identifier(s) contained in that signal, demo policies are automatically assigned to the electronic device 102. More specifically, the electronic device 102, after receiving the beacon identifier(s) associated with a known location, may provide the known location to the device software and/or company of the software without the use of GPS. Once the retail site has been identified all relevant data points (such as store number, region, address, etc.) and predetermined policies (such as security measures (locking types), configuration, and demo content used on live displays) can be assigned through automation.

The processor 104 is configured, via the execution of the security monitoring instructions 116, to monitor the retail display of the electronic device 102 for a security trigger event, or trigger. The monitoring for the security trigger event may use one or more components of the electronic device 102. For example, the electronic device 102 may include an accelerometer 122 or other sensor configured to detect and characterize movement. One or more antennas 111 or other electromagnetic circuitry of the electronic device 102 may be used to detect or determine distances. The monitoring may also involve detecting a disconnection at one or more ports or interfaces of the electronic device 102, such as accessory/input ports and a power port, or disconnection from a wireless power supply, such as an induction charger. Examples of trigger events involving such sensors and circuitry include removing the electronic device 102 from a proximity zone, moving the electronic device 102 in a manner indicative of theft, or one or more disconnections of the electronic device 102, such as disconnection form a power source, either wired or wireless, as well as auto-triggers related to dates, days, and/or times. Still other types of trigger events may alternatively or additionally be used, including, for instance, beacon detection-based trigger events as described below.

The monitoring for a trigger event may also involve communications or other interaction with another device. For example, the electronic device 102 may receive a signal or message from an alarm unit or other security system component indicative of an alarm condition within the retail store. An attempted theft of other merchandise in the retail environment may thus lock down other merchandise on display.

The trigger event may involve the operation of one or more components other than, or in addition to, the electronic device 102. For example, the processor 104 may be configured via execution of the monitoring instructions 116 to detect actions of other devices as the trigger event. In another example, the processor 104 may be configured via execution of the monitoring instructions 116 to detect and determine when certain criteria or circumstances are satisfied, such as when certain thresholds are met or exceeded, as the trigger event. For instance, as will be described below in more detail, the processor 104 may be configured via execution of the monitoring instructions 116 to detect when a profile of wireless beacon devices exceeds a threshold.

In another example, the trigger event may involve the operation of the electronic device 102 itself. For instance, the processor 104 may be configured via execution of the monitoring instructions 116 to consider various user actions as a trigger event. Examples include (i) an attempt to delete or disable an application, firmware, or other monitoring instructions, (ii) discontinue a monitoring service, (iii) detach an agent of the monitoring service, or (iv) power-off the electronic device 102.

In another example, the trigger event may be an auto-locking trigger event based on dates, days, times, or combinations thereof. For instance, a predetermined date schedule may be set that keeps an enrolled device locked during supply chain fulfillment or during storage (e.g., in retail) until the device is delivered, sold, or activated. Similarly, day-of-the-week and/or time schedules may be set for different devices, such as demo devices, employee handheld devices, POS devices, etc. so that the devices get auto-locked during non-operating business hours. Other types of trigger events may be used.

In one example, upon detection of one or more trigger events, the execution of the security monitoring instructions 116 causes the processor 104 to initiate a security measure, or benefit denial, such as locking the user interface(s) 108 of the electronic device 102. For instance, a touchscreen or other display may display a warning message regarding a locking of the electronic device 102 until the trigger event ends. The warning message may continue to be displayed until the trigger event, or events, is no longer present.

The nature of the security measure, such as locking, may vary with the type of trigger event. In some cases, the security monitoring instructions 116 define multiple levels of security measures. For instance, a major or primary trigger event may cause the security monitoring instructions 116 to configure the processor 104, upon the detection of the trigger event, to generate an alarm that cannot be deactivated by merely discontinuing the trigger event. Unlocking the electronic device 102 may need to involve a key, code, or other disarming mechanism. In contrast, some trigger events may be sufficiently minor or secondary that removal of the trigger event automatically ceases the security measure, such as unlocking the electronic device 102 or deactivating the alarm.

Whether primary or secondary, the trigger events and associated security measures may be defined by the security monitoring instructions 116 such that the user interface 108 is locked before removal of the electronic device 100 from the retail site. The disclosed digital signature detection and triggering algorithms are designed to be low latency so that security measures triggered by a trigger event happen very quickly when needed, such as in real-time, to provide a more immediate theft deterrence. Such immediacy of the locking may help to deter and/or prevent theft. The nature, extent, duration, unlocking and/or other characteristics of the lock may vary considerably.

The trigger events and security measures, such as locking, may not involve a theft attempt. For instance, the security monitoring instructions 116 may be directed to preserving a display state of the electronic device 102. In some cases, the trigger event may involve a user attempt to sign in/out of an application or service. Signing out of a service may load personal data or otherwise personalize the electronic device 102 in a manner inappropriate for a retail environment. The monitoring instructions 116 may detect an attempt at signing out of a user account directed to retail display. The locking may thus inhibit the customization of the electronic device 102. The monitoring instructions 116 may alternatively or additionally alert a store employee of the need to wipe or clear user data from the electronic device 102. In some cases, the monitoring instructions 116 configure the processor 104 to prompt the store employee, e.g., after an unlocking, to initiate a device wipe or other housekeeping measure.

The locking may inhibit some or all of the input/output functions of the user interface(s) 108. For instance, the locking may not allow any data input in some cases. In other cases, the touchscreen may present a data entry field to allow an unlock code to be provided.

Implementing security measures, such as locking, may be implemented in a timely fashion. For instance, the locking of the user interface of the electronic device 102 may be implemented before removal of the electronic device 102 from the retail site in which the retail display is provided. The display of a message via the touchscreen and/or other user interface may provide an alert that dissuades any further movement or actions. Upon seeing the message, a prospective thief may no longer attempt to steal the electronic device 102. The message may also help a prospective consumer that inadvertently causes a trigger event to avoid triggering a higher-level security measure. Thus, as discussed above, the triggering happens in real-time, such as, for example, within 3 seconds of a trigger event.

As described above, the security measures, or benefit denials, may vary in accordance with the trigger event or events. Different types of trigger events may cause different levels or types of security measures. In some cases, the security measures include actions or operations in addition to locking the electronic device 102. For instance, the electronic device 102 may capture images via a camera, send alerts and other messages to an alarm unit and/or law enforcement, and otherwise capture and/or generate data in connection with the trigger event. For example, a locking of the electronic device 102 may include or involve generating a warning of some kind. In some cases, the warning is generated on a display of the electronic device 102. The warning may display a message regarding a locking of the electronic device 102 until the trigger event ends. Alternatively or additionally, a report regarding the trigger event may be generated and sent as well. For example, a message may be sent to an alarm unit, store employee, or other system operator or component. The report or other message may relay details regarding the trigger event, such as the details of a logout attempt. In some cases (e.g., with a primary trigger event), the security measure includes or results in the generation of an alarm that cannot be deactivated by discontinuing the trigger event. For instance, an attempt to discontinue the alarm, warning, or other device lock by shutting down the electronic device 102 (e.g., powering off the electronic device 102) would result in the electronic device 102 remaining in the locked state once the electronic device 102 is powered back on. Knowing that the electronic device 102 will remain locked, a prospective thief will be deterred from stealing the electronic device 102.

In some cases, the security measure includes implementation of a data wiping procedure. The data wiping procedure may remove user data from the electronic device 102 and/or return the electronic device 102 to factory settings and/or another state (e.g., a retail display state). The data wiping procedure may be implemented in connection with, or separately from, a locking.

Similarly, steps taken to undo or disable the security measure, such as unlocking the electronic device 102, may vary. In some cases, removal of the trigger event is sufficient to unlock the electronic device 102. A higher level of locking may necessitate the performance of one or more additional steps to unlock the electronic device 102, including, for instance, the provision of an unlock or release code or the required assistance of a retail store employee. The security measure may be removed manually and/or automatically. For example, in some cases, the electronic device 102 may be unlocked automatically if one or more of the triggers are no longer present. User intervention may also be used (e.g., needed) to disable or deactivate the security measure. In other cases, for example, if one or more of the triggers are no longer present, a PIN, key or other security information may be used (e.g., needed) to unlock the device, for example. Other manual intervention may be used.

The nature of the security measures (i.e., alarms or benefit denial) may vary as described above. One or more alarms and/or benefit denials may be activated based on one or more triggers. Any trigger detectable by the disclosed software solution may be used.

The software solution may trigger the alarm and/or benefit denial based on losing connection to an external power source. For example, in a low security environment (e.g., a corporate or educational environment) where the electronic device 102 may not be physically secured to the location, the electronic device 102 may be plugged into or otherwise connected to (i.e., wirelessly) external power. Therefore, unplugging the electronic device 102 from a power source, or removing the electronic device 102 from a wireless charging pad or stand, may trigger an alarm or the benefit denial. Further, the software solution may only trigger an alarm and may not include benefit denial (e.g., in a low security environment).

The software solution may also access a near field communication (NFC) or radiofrequency identification (RFID) reader on the electronic device 102 (e.g., in a mobile handset). The software solution may read and/or write to external NFC tags and/or other NFC-enabled devices that monitor the electronic device 102 location, identification, etc. The software solution may also read and/or monitor connection with RFID-enabled tags and/or other devices. For example, low-frequency (LF), high-frequency (HF), ultra-high-frequency (UHF), or other RFID technology may be used. The software solution may also access other functionality of the electronic device 102 (e.g., wi-fi, mobile, Bluetooth, etc.) to monitor the electronic device 102 and the surrounding environment and trigger the alarms and/or benefit denial. For example, the software solution may be triggered if the electronic device 102 can no longer detect one or more wireless transmitters, such as a beacon, etc.

The disclosed systems, devices and methods may also capture interactive data from the electronic device 102. For example, the disclosed systems, devices and methods may log user interactions and usage on the electronic device 102, such as device lift and place events and dwell times. The disclosed systems, devices and methods may also log electronic interactions with the electronic device 102, such as communication events with other devices. The interactive data may be captured and stored as timestamps in a database, such as database 126 hosted by a server computer 127. The disclosed systems, devices and methods may be configured to provide analytics for the electronic device 102 based on the data. The data and/or analytics may be uploaded to a local or remote (e.g., cloud-based) server, such as server computer 127. The uploaded data may be used by the server or other device to provide analytics on the electronic device 102.

The nature of the trigger events may vary. As described above, examples of trigger events include disconnection from an external power source, loss of data integrity, movement of the electronic device 102, and loss of communication and/or signal reception. The disclosed systems, devices and methods may monitor for alternative or additional types of trigger events, including beacon detection-based trigger events. In such cases, and as described below, the electronic device 102 may be locked upon detecting a change in a profile of the wireless beacon devices broadcasting to, visible to, or detected by, the electronic device 102. The locking and unlocking in connection with any combination of these and/or other trigger events may progress, be prioritized or otherwise layered in various ways. In this way, the disclosed systems, devices and methods may monitor a digital fingerprint of an electronic device 102 where the fingerprint is made up of various types of trigger events, as discussed herein. Based on the fingerprint, or a change of the fingerprint, of the electronic device 102, various security measures may be implemented. For example, an initial notification, such as a pop-up message displayed on the electronic device 102, may be in response to a first type of trigger. Next, based on another trigger, another warning message (with or without an audible component) may be displayed. The next security measures, which may or may not be sequential, based on yet other trigger events, may be certain types of benefit denials, such as locking the electronic device 102. These benefit denials may or may not be accompanied by audible alerts.

Referring back to FIG. 1, the electronic device 102 includes a processor 104 and a memory 106 on or in which security monitoring instructions are stored. The processor 104 and the memory 106 may be configured as described above. The persistence of the security monitoring functionality may be supported or established as described above.

The electronic device 102 may also include a communication module 110 as described above. In this example, the communication-related components of the electronic device 102 include a network communication chip (or chipset) 128 ("network chip") and an antenna 111 in communication with the networking chip 128. The network chip 128 may be directed to establishing Wi-Fi communications in accordance with one or more of the IEEE 802.11 standards. Additional or alternative network communication protocols or standards may be supported. The network chip 128 may include any number of chips or other circuit components, such as components directed to processing (e.g., a microprocessor), memory (e.g., random access memory), transceiver functionality (e.g., a transmit/receive switch, power amplifier, matching, etc.). The extent to which such components are integrated may vary to any desired extent.

The antenna 111 may include one or more antenna elements. For instance, the antenna 111 may include one antenna element for communications within or over one frequency range, and another antenna element for communications within or over another frequency range. A variety of different network communications may thus be supported.

The system 100 includes a plurality of wireless beacon devices 141-144. Each wireless beacon device 141-144 broadcasts or transmits a respective signal at regular intervals. For instance, the wireless beacon signals may be or include Bluetooth Low Energy (BLE) signals. Additional and/or alternative types of wireless beacon signals may be broadcast. For example, other types of Bluetooth signals may be broadcast, including, for example, higher power and longer-range signals. The wireless beacon devices 141-144 may be configured for operation in infrastructure or peer-to-peer (or ad hoc) mode. The wireless beacon devices 141-144 may only broadcast or transmit data or signals and may be uncapable of receiving data or signals. In this way, the wireless beacon devices 141-144 are considered one-way transmitters and perform only one-way transmissions.

The signals of the wireless beacon devices 141-144 may contain small amounts of data or beacon identifiers, including, for example, identity numbers (IDs) or names, spatial data (location), status information (battery status, temperature, etc.), retail product or service information (such as store number, region, address, and other retailer-specific data), and one or more URLs. For example, a wireless beacon device 141-144 may broadcast a signal that contains a URL that directs a device detecting the signal to a website that automatically downloads security monitoring instructions 116 onto that device, as discussed above. Alternative or additional identifiers or other data may be included in the beacon signals as well.

The beacon identifiers (i.e., information specific to the wireless beacons devices 141-144 used to identify them) associated with a retail location may be useful for a number of purposes. For example, as discussed above, beacon identifiers may be used to automatically assign predetermined demo policies (security measures such as locking types and configuration along with demo content used on live displays) prior to activation. In another example, predetermined defined fields and data (Store #, Region, Address, etc. any data points relevant to the retail location) may be automatically assigned prior to activation based on the beacon identifiers. In another example, beacon identifiers may be used to discover what location (i.e., what retailer) a device is located in after being stolen. For example, if a device is stolen from a T-Mobile location and a customer in possession of the stolen device shows up in a Verizon location also using the disclosed systems, devices and methods, once the Verizon location wireless beacons are "visible" to the device (due to the device receiving the signals from the Verizon wireless beacons) the device may communicate the location associated with the received beacon identifiers to its back-end server and the location of the stolen device could then be identified specifically without GPS.

Each wireless beacon device 141-144 may be or otherwise include a wireless transmitter operable to broadcast data at regular time intervals. Since each wireless beacon device 141-144 transmits signals in a given range, multiple wireless beacon devices 141-144 may be used. For example, as will be discussed in more detail below in connection with the examples depicted in FIG. 2, multiple wireless beacon devices 141-144 may be deployed inside a retail environment (i.e., store) at different locations throughout the retail environment, such as at the back of a store, middle of the store, front of the store, at or near an exit of the store, and/or outside the store. The number of wireless beacon devices 141-144 may accordingly vary. Any number of wireless beacon devices 141-144 may be included.

The wireless beacon devices 141-144 may or may not be associated with the retail environment in which the electronic device 102 is displayed. In some cases, all of the wireless beacon devices 141-144 are associated with the retail store or other environment. In other cases, any number of the wireless beacon devices 141-144 are associated with a nearby business or other entity. In either case, the location and other characteristics of the wireless beacon devices 141-144 may generally remain over time. For example, the wireless transmitters in a retail environment or nearby business may be installed as fixtures or otherwise remain stationary. The corresponding broadcasts of the respective wireless beacon signals may also remain consistent over time. The signal strengths of the wireless beacon signals at various positions in the retail environment may thus be unique and consistent. In this way, changes to the detectability of the wireless beacon signals may be indicative of movement of the electronic device 102. The detectability of the wireless beacon signals may thus be used as a trigger event for an unauthorized removal of the electronic device 102 from the retail display.

The wireless beacon devices 141-144 may not be connected to an external network 101, such as the Internet. In the example of FIG. 1, none of the wireless beacon devices 141-144 are connected to the external network 101. The wireless beacon devices 141-144 may accordingly be considered to be offline. However, each of the offline wireless beacon devices 141-144 broadcasts a respective wireless beacon signal despite not providing data communications to and from the electronic device 102 or external network 101. The offline or disconnected wireless beacon devices 141-144 may thus be provided as dummy, or mock, devices directed or dedicated to security purposes, rather than communications. Such offline or disconnected wireless beacon devices 141-144 may be referred to herein as "security-dedicated wireless beacon devices."

In some cases, the security-dedicated wireless beacon devices may be battery powered. For example, each security-dedicated wireless beacon device may be equipped or otherwise configured with, or otherwise include, one or more lithium batteries. The battery (or batteries) may be configured for long-term power supply. In some cases, low powered battery-operated wireless beacons are used in order to extend the battery life of the wireless beacons. In one example, power levels on the order of 10 mW may be used. In another example, transmission power levels may be at or below 1.0 mW. Battery powered operation may be useful for strategic placement or deployment of the security-dedicated wireless beacon devices throughout the retail environment. For instance, the security-dedicated wireless beacon devices may be disposed in locations that are inconvenient for wired power delivery, but nevertheless useful for security purposes. Battery powered operation may be useful for facilitating implementation or deployment of the disclosed methods and systems, e.g., without forcing a retailer to modify the installations of its active wireless beacon and network communication devices.

The processor 104 of the electronic device 102 is configured to execute the security monitoring instructions 116 to monitor a profile of the plurality of wireless beacon devices 141-144 detected via the antenna 111. The profile may be indicative of a list of the IDs or other identifiers of the beacon devices 141-144 detected by the electronic device 102. The profile may also include further data, such as data indicative of quantities of wireless beacon devices 141-144 detected, types of wireless beacon devices 141-144 detected, and signal strengths of wireless beacon devices 141-144 detected via the antenna 111 of the electronic device 102. In one example, the types of wireless beacon devices 141-144 are indicative of locations of the wireless beacon devices 141-144, which may be locations relative to a location associated with an exit of a retail environment, as will be discussed in more detail below in connection with the examples depicted in FIG. 2.

In this way, the profile may be a fingerprint or footprint (i.e., digital signature) of wireless beacon devices 141-144 near, or in a certain proximity (i.e., range), of the electronic device 102. Since the locations and IDs or other identifiers of the wireless beacon devices 141-144 are known, and fixed as described above, the profile of wireless beacon devices 141-144 allows the location of the electronic device 102 to be determined. As the location of the electronic device 102 changes, such as when the electronic device 102 is picked up and moved by a customer throughout the retail environment, the profile of the wireless beacon devices 141-144 also changes, since the antenna 111 of the electronic device 102 will detect new or different wireless beacon devices 141-144 than in the previous device location.

The processor 104 of the electronic device 102 is further configured via the execution of the security monitoring instructions 116 to, upon detection of a profile of wireless beacon devices 141-144 that exceeds a threshold, initiate a security measure for the electronic device 102. In this case, the detection of a profile exceeding a threshold is the trigger event leading to the security measure. As described above, there are a number of security measures that may be implemented, including locking (i.e., bricking) the electronic device 102, sounding an alarm, displaying a message on the user interface 108 of the electronic device 102, capturing images via a camera, sending alerts and/or other messages to an alarm unit, store employee, and/or law enforcement. As discussed above, the security measure initiated by the processor 104 in response to the trigger event (i.e., detection of a profile that exceeds a threshold) happens in real-time to provide a more immediate theft deterrence.

The processor 104 of the electronic device 102 may also be configured via the execution of the security monitoring instructions 116 to, upon detection of a change in the profile of the wireless beacon devices 141-144 that exceeds one or more thresholds, lock a user interface 108 of the electronic device 102. The locking of the user interface 108 may be configured or proceed as described above with the other trigger events. For instance, the locking may include an alarm or alert.

The change may be relative to a base or reference profile. Base profile data for a home base location of the electronic device 102 may be stored in the memory 106. In one example, the home base location may be a display location of the electronic device 102 within a retail environment. The processor 104 may thus be further configured via the execution of the security monitoring instructions 116 to implement a comparison to detect the change. Data indicative of the profile may be compared with the base profile data for the home base location. The home base location may be or include a display stand, pad, or other fixture for displaying the electronic device 102. Alternatively or additionally, the home base location may be a display area, such as a respective area of a retail store. The strength and availability of wireless beacon signals at the home base location remain substantially constant as long as the wireless beacon devices 141-144 are stationary. As described above, a change in the profile is therefore indicative of movement of the electronic device 102 away from the home base location.

The processor 104 of the electronic device 102 may also be configured via the execution of the security monitoring instructions 116 to, upon detection of power being supplied to the electronic device 102, implement a comparison of data indicative of the profile with the base profile data to detect whether the electronic device 102 is at the home base location. Detecting power being supplied to the electronic device 102 is indicative of the device 102 being put back on a display unit or in a display area, since display units or areas are often supplied with power (either wirelessly/inductively or via power cables). Knowing where devices are being supplied with power thus leads to knowing where devices are being displayed. This allows for a level of compliance monitoring for in-store display location requirements, which may be referred to as plan-o-gram compliance monitoring.

The detection of a loss of power may also be a trigger event that leads to a security measure, such as a power loss alert. In this way, the processor 104 is further configured via the execution of the security monitoring instructions 116 to, upon detection of power no longer being supplied to the electronic device 102, initiate another security measure for the electronic device 102. For instance, when an electronic device 102 is removed from the wireless charging stand or display, the disclosed systems, methods, and devices detect power loss and can initiate a pop up message or warning alert on the device screen to let the customer know the device is protected by security measures. In one example, a timer, which may or may not be displayed, may also be started and if the device stays off power too long, another security measure such as a device lock could be triggered. This ensures that the device gets returned to its "cradle" (wireless charger stand) or charging pad/area.

The base profile data may be established by the electronic device 102. For instance, the processor 104 may direct the network chip 128 to implement a scan to capture the base profile data via the antenna 111 upon entry of a passcode via the user interface 108 or other unlocking of the electronic device 102 (e.g., an automatic unlocking of the electronic device 102 as a result of a power re-connection). The update to the base profile data may happen automatically upon completion of the scan. Updates to the base profile data may occur in alternative or additional ways, including, for example, via receipt of an instruction from a server or other security system computer, such as server computer 127.

The detection of a change in profile may not involve base profile data. For instance, a change in profile may be detected more dynamically, including, for instance, one or more comparisons with preceding profile measurements. For example, a change in profile may be detected by determining a rate of change for one or more wireless beacon devices 141-144.

In one example, the threshold may include predetermined signal strengths for a predetermined number and type of wireless beacon devices 141-144. In another example, the threshold may include a predetermined range of signal strengths, such as any signal strengths within the range of around 70% or higher than a certain, predetermined signal strength. As discussed above, the type of wireless beacon devices 141-144 may be indicative of a location of the wireless beacon devices 141-144, where the location may be relative to an exit of a retail environment. One or more thresholds may be used to avoid triggering a security measure such as locking based on insignificant changes to the profile. False positives, such as a temporary discontinuation in signal broadcasting by one of the wireless beacon devices 141-144, may thus be avoided. The threshold may involve or include any parameter (or parameters) indicative of the profile wireless beacon devices 141-144. For instance, the threshold may establish that the inability to detect more than a certain number, such as half, of the beacons in the base profile constitutes a change in the profile. Alternatively or additionally, the threshold may establish that a decrease in signal strength of over 70% for a predetermined number or percentage of beacons constitutes a change in the profile. The parameter may be a composite or calculated parameter indicative of a combination of other parameters. For instance, a score may be calculated in accordance with any number of parameters, including the presence of each wireless beacon devices 141-144, the signal strength of each wireless beacon devices 141-144, the order of the beacons by signal strength, etc. The threshold may then be a quantity for comparison with the score. For instance, a score exceeding the threshold is thus deemed to be indicative of a change in the profile.

False positive trigger events may also be caused by ambient wireless interference, such as by nearby wireless communication components of wireless (WiFi) communication networks, such as routers, access points, radio network interface cards (NIC), repeaters, laptops, PCs, and PDAs, as well as other non-WiFi devices, such as microwaves, cordless phones, analog wireless cameras, Bluetooth headsets or radios, and wireless jammers. To avoid these types of false triggers, longer range (i.e., higher power) wireless beacon devices 141-144 may be used. In this way, monitoring the received signal strengths of the wireless beacon devices 141-144 and triggering security measures based on signal strength threshold logic may be used rather than relying on detecting the presence or absence of a lower power signal, which could fall below the noise floor and cause false positives.

To guard against obstacles, including bodies attenuating the beacon signals and causing false positives, several wireless beacon devices 141-144 may be used. As will be discussed in more detail below in connection with the examples depicted in FIG. 2, using multiple wireless beacon devices 141-144 placed strategically throughout store, such as throughout the back half of the store and near the front of the store by the entry/exit, ensures that there is always some wireless beacon devices 141-144 that are obstacle free and/or close enough to the monitoring electronic device 102 (demo phone or tablet) no matter where the electronic device 102 is located in the store.

Using multiple wireless beacon devices 141-144 provides another advantage. For example, a would be theft may consider bringing a beacon into a store that mimics the wireless beacon devices 141-144 and then walking out with the electronic device 102, thinking that their "dummy beacon" will fool the electronic device 102 into thinking it is still receiving signals from a wireless beacon device 141-144 inside the store. Monitoring for transmissions or signals from multiple wireless beacon devices 141-144 and determining actions based on those multiple signals helps guard against defeating the disclosed system in this manner using dummy beacons.

The electronic device 102 may monitor the profile of wireless beacon devices 141-144 continuously or discontinuously. For example, the electronic device 102 may scan for the wireless beacon devices 141-144 at predetermined intervals, or after a predetermined amount of time since the last scan. Thus, the processor 104 of the electronic device 102 may further be configured via the execution of the security monitoring instructions 116 to periodically capture current profile data for the profile of wireless beacon devices 141-144 detected via the antenna 111. Alternatively or additionally, the electronic device 102 may scan for, or otherwise monitor the profile of, the wireless beacon devices 141-144 upon the detection of a predetermined occurrence. For instance, in the example of FIG. 1, the electronic device 102 includes an accelerometer 122. The accelerator 122 may provide a report to the processor 104 upon detection of movement of the electronic device 102. The processor 104 may then be further configured via the execution of the security monitoring instructions 116 to capture the current profile data for the profile upon detection of movement by the accelerometer 122. Alternative or additional occurrences may be used, including, for instance, detecting a disconnection or an actuation (e.g., a button press) of the electronic device 102. The frequency of the scans or other monitoring may also be modified upon the detection of such or other occurrences.

Other types of profile comparisons or changes may be used to trigger one or more security measures, such as the locking of the user interface 108. For example, exit profile data may be stored in the memory 106. The exit profile data is indicative of wireless beacon devices 141-144 disposed at a location associated with an exit of the retail environment. For instance, a wireless beacon device 141-144 may be positioned above a door or other entryway of a retail store. In such cases, the processor 104 is further configured via the execution of the security monitoring instructions 116 to compare the profile with the exit profile data and, upon detection of a match between the profile and the exit profile data, lock the user interface 108 of the electronic device 102. In the example involving a wireless beacon device 141-144 above a door, the detection of the wireless beacon device 141-144 may be used to indicate that the electronic device 102 is passing through, or otherwise too close to, the door, thereby warranting a locking. The detection of the match may be combined with one or more thresholds, such as a threshold signal strength and/or an ordering in which the exit wireless beacon device 141-144 is found to have one of the top (e.g., top three) strongest signals.

Figure 2:
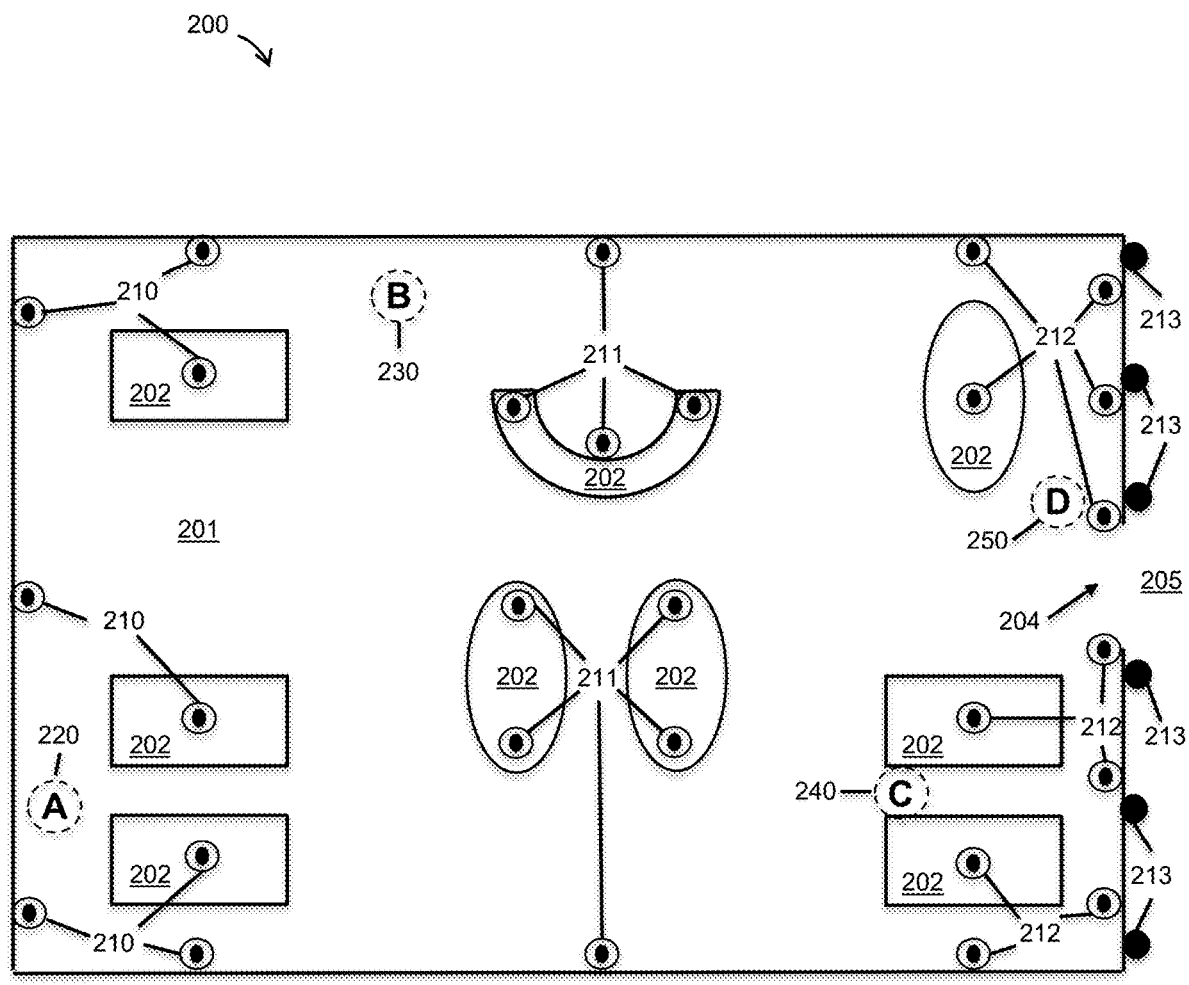
FIG. 2 is a schematic diagram of a floor plan of a retail environment in which integrated security monitoring based on beacon detection is provided in accordance with one example.

FIG. 2 is a schematic diagram of a floor plan of a retail environment in which integrated security monitoring based on beacon detection is provided in accordance with one example. FIG. 2 illustrates a plan view of a retail environment, or store 200. The store 200 has an interior 201 with multiple display tables 202. The store 200 has one exit 204 that leads to the exterior 205 of the store 200. Any number of exits are possible.

The store 200 contains one or more types of wireless beacon devices. In the example shown in FIG. 2, the store 200 contains at least two types of wireless beacon devices: in-store beacons 210-212 (i.e., interior beacons) and out-of-store or exit beacons 213 (i.e., exterior beacons). The in-store beacons 210-212 include in-store rear beacons 210 (IRBs 210), in-store middle beacons 211 (IMBs 211), and in-store front beacons 212 (IFBs 212). The out-of-store exterior beacons 213 may be referred to as OEBs 213. While the example shown in FIG. 2 has three types of interior beacons 210-212, any number of different types of beacons may be used. In one example, only one type of in-store beacon may be used. In another example, perimeter beacons may be used as well and placed along the entire perimeter of the store, either along the inside perimeter, the outside perimeter, or both. In yet another example, beacons may be placed under the display tables 202. Also, while the example shown in FIG. 2 has 28 interior beacons 210-212, any number of beacons may be used. As discussed above, the more beacons installed allows interference due to customers, walls, and ambient wireless technology to be avoided. Having a higher number of beacons also results in less false triggers, as described above, and allows for a finer resolution detection (i.e., a finer granularity in beacon detection and monitoring, which leads to a more accurate determination of a device location). In one example, having multiple beacons, such as those depicted in FIG. 2, allows for a resolution range to be less than 20 feet. Also as discussed above, having multiple beacons ensures that there are always some wireless beacon devices that are obstacle free and/or close enough to the monitoring electronic device 102 (demo phone or tablet) no matter where the electronic device 102 is located in the store 200.

As shown in FIG. 2, there are four locations 220, 230, 240, 250 within the store 200 denoted by the letters A, B, C, and D within dashed circles. The A location may be referred to as the first location 220, the B location may be referred to as the second location 230, the C location may be referred to as the third location 240, and the D location may be referred to as the fourth location 250. Each of the four locations 220, 230, 240, 250 may represent a current location of an electronic device 102 after being removed from its home base location by a customer. For example, the customer may have picked up the electronic device 102 to inspect it and may have moved away from where the electronic device 102 was charging (i.e., home base location).

As discussed above, removing the electronic device 102 from the charging station may have initiated a first or initial security measure, such as displaying a message to the customer that security protocols are in place and/or starting a timer for the electronic device 102 to be returned to its charging station. Picking up the electronic device 102 and/or moving the electronic device 102 away from its charging station may also cause the processor 102 to perform a scan using the antenna 111 of the electronic device 102 to detect a current profile of wireless beacon devices 210-212 within range of the electronic device 102. In other words, the current profile data for the profile of wireless beacon devices 210-212 may be captured upon picking up and/or moving the electronic device 102. As discussed above, profiles include quantities of beacons detected, types of beacons detected, and signal strengths of beacons detected.

In the examples shown in FIG. 2, the profile of wireless beacon devices captured from an electronic device 102 at the first location A 220 may include five IRBs 210 all within a predetermined signal strength range (i.e., range where a signal strength is around or above 70% of a predetermined signal strength). The profile of wireless beacon devices captured from an electronic device 102 at the second location B 230 may include two IRBs 210 and two IMBs 211 within the predetermined signal strength range. The profile of wireless beacon devices captured from an electronic device 102 at the third location C 240 may include one IMB 211, six IFBs 212, and one OEB 213 within the predetermined signal strength range. For the third location C 240, the profile may also include two additional OEBs 213 with signal strengths just below the predetermined signal strength range. The profile of wireless beacon devices captured from an electronic device 102 at the fourth location D 250 may include five IFBs 212 and three OEBs 213 within the predetermined signal strength range. For the fourth location D 250, the profile may also include one additional IFB 212 and one additional OEB 213 with a signal strength just below the predetermined signal strength range.

As discussed above, there are a number of ways in which a security measure may be initiated. In one example, the processor 104 of the electronic device 102 may initiate a security measure if it detects that a profile exceeds a threshold. For instance, a threshold may require at least two OEBs 213 at a predetermined signal strength (or within a predetermined signal strength range). In this case, for the profiles described above for the four locations 220, 230, 240, 250, the only profile that would exceed the threshold is the fourth location D 250, since that profile contains three OEBs 213 within the predetermined signal strength range. If the predetermined signal strength in the threshold was lower (or the predetermined signal strength range was higher), the third location C 240 may also trigger a security measure, since the third location C 240 also included two additional OEBs 213 in its associated profile that were close to the prior threshold.

In another example, a "near exit" security measure (alert, lock, etc.) may be used. For example, when the processor via the security monitoring instructions determines that the device is near an exit 205 or outside the store 200, it can pop up a more serious warning and optionally play an audible sound to alert people to return back into the store or it can trigger an immediate lock, a delayed lock, or use additional signal level logic from the beacons to determine locking triggers. For example, once an exit threshold has been triggered, if the in-store beacon signals 210-212 continue to get weaker the device is most likely moving out of the store 200, so a lock can be triggered (i.e., a trigger event is initiated). In this example, an exit profile may be stored in the memory of the electronic device 102 and the processor 104 may compare the exit profile with the current profile to determine whether there is a match and, if so, lock the device. For example, the exit profile may include the two IFBs 212 and two OEBs 213 located right next to the exit 205. In the examples discussed above for the four locations 220, 230, 240, 250, the profile for the fourth location D 250 would again trigger a security measure, since the profile for that location 250 includes two IFBs 212 and two OEBs 213 located right next to the exit 205. In this way, when a pre-determined near the exit threshold is triggered, the disclosed systems, methods, and devices monitor the in-store beacon levels and if they continue to drop (device is moving out of the door), the device may be locked.

In yet another example, a change in profile data may result in a security measure. For instance, as the device 102 moves toward the exit 205, the signals from in-store beacons 210-212 will drop and the out-of-store beacon 213 signals will increase. For example, if a customer picked up an electronic device 102 near the first location A 220 and then walked to the third location C 240 or fourth location D 250, the signals from IRBs 210 will disappear, as will the signals from the IMBs 211, and the signals from the IFBs 212 and OEBs 213 will get stronger. In this case, the processor via the security instructions would detect a profile change that exceeds a threshold and a security measure would be initiated, such as locking the user interface of the device.

In another example, an "outside store" security measure may be used. For example, if the antenna 111 of the device 102 fails to pick up any signals from in-store beacons 210-212 or picks up sufficiently low signals from in-store beacons 210-212 and/or picks up sufficiently strong signals near the exit 205 or out-of-store beacons 213, a security measure such as a lock may be implemented.

As shown above, the disclosed threshold and triggering logic may be configured and adjusted for many types of triggering scenarios using any combination of security measures. One example is using only in-store beacons where security measures are triggered based on the proximity values of the in-store beacons (i.e., where the electronic device 102 is in relation to which, or how many, in-store beacons). In another example, in-store and out-of-store (i.e., exit) beacons may be used, where warning-type security measures are triggered based on a change of signal strength values and where locking-type security measures are triggered based on proximity values to either the in-store beacons, the out-of-store beacons, or some combination of both. In yet another example, both in-store beacons and out-of-store beacons may be used where both the warning-type and locking-type security measures are triggered based on a change of signal strength values. Other variations are possible.

Once certain security measures are triggered, such as the "near exit" or "outside store" locks discussed above, certain actions may need to be taken in order to disable the security measure, such as unlocking the device. For instance, the device may need to return into the store before the device can be unlocked. However, to prevent the device from constantly locking and unlocking near the exit, the security monitoring instructions 116 may be configured to wait until the device returns further into the store in order to unlock. For example, the device may need to return past the middle of the store before unlocking. In this case, the signal strength thresholds for in-store beacons 210-212 would change, such that once the antenna 111 picks up enough sufficiently strong signal strengths for either IMBs 211 or IRBs 210, the device may disable the security measure (i.e., unlocks). In other words, the beacon trigger thresholds may include hysteresis. For instance, the threshold for locking may differ from the threshold for unlocking. In this way, the triggering is more stable. In that case, when the device is near a boundary line (like near an exit) it will not jump back and forth between locked and unlocked even if something changes in the environment such as another person walks by. For example, when a device locks, the required in-store beacon 210-212 threshold can be increased so the customer with the device has to come further back into the middle of the store before an unlock trigger can occur. Once this happens, in-store beacon 210-212 threshold can be decreased again so that it is back to the normal in/out logic. To accomplish this, the processor 104 is further configured via the execution of the security monitoring instructions 116 to, upon the initiation of the security measure, dynamically change the threshold to another threshold and, upon detection of an updated profile of wireless beacon devices that exceeds the other threshold, initiate another security measure for the electronic device 102.

While the store 200 in FIG. 2 has only one exit 204, additional entrances/exits are possible. The number, type, and placement of the wireless beacons, and thus the beacon profiles and thresholds, may depend on the type of store 200 and layout of the store 200, including the number of exits the store has. For example, a store having access points (i.e., entrances/exits) along multiple walls, or all of the walls, may use a different approach to monitor the profile of the wireless beacon devices, since having multiple exits presents additional possible security breaches, such as theft. In this case, the thresholds may be lower than the examples discussed above, since a device location along any wall of the store may present a security risk if each wall contains an exit. For instance, the store 200 may be divided into different beacon zones, such as a central zone in the center of the store, an intermediate zone that surrounds the central zone, and an outer or perimeter zone that surrounds the intermediate zone and forms a perimeter of the store. In this case, each zone may have a certain number of beacons associated with that particular zone. Monitoring the profiles of the beacon devices in each zone, or between zones, may be performed similarly to the examples discussed above.

As discussed above, an electronic device 102 may record and store its home base location as a base profile. This home base location may be any one of the display tables 202, or portions thereof, shown in FIG. 2. As discussed above, knowing the home base location for devices aids in plan-o-gram compliance. The disclosed systems, methods, and devices may also track other movements of the devices, such as where and how often a particular device is picked up (i.e., lift data). Knowing how often certain devices are picked up may indicate a customer preference for those particular devices. Tracking these types of movements may be performed by each device, such as by a processor via the security monitoring instructions and/or the accelerometer.

Figure 3:
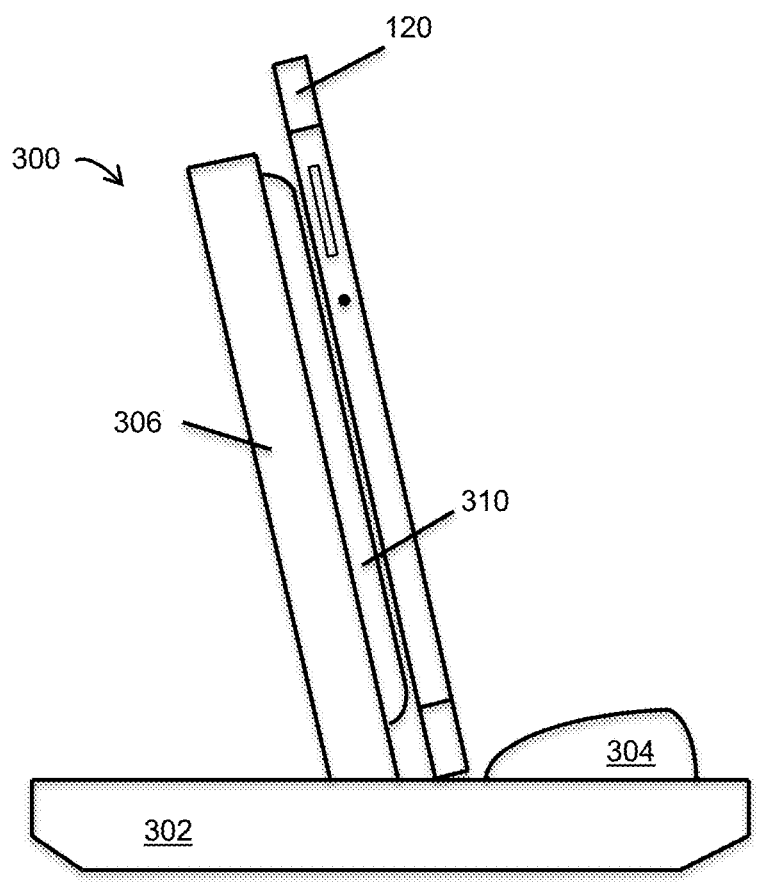
FIG. 3 illustrates a side view of retail display charger for an electronic device on retail display in accordance with one example.

FIG. 3 illustrates a side view of retail display charger 300 for an electronic device 102 on retail display in accordance with one example. As discussed above, to enhance customer shopping experience, electronic devices 102 may be displayed in a tetherless manner (i.e., no hardware, sensors, cables, or tethers attached) while still being provided with power so that the batteries of the devices remain charged. Wireless charging units, such as the wireless charging station, charger, or stand 300 shown in FIG. 3, may be used to achieve this goal. The wireless charging stand 300 of FIG. 3 includes a base 302 and a device support 306. The base 302 includes a stopper 304 to prevent the electronic device 102 from sliding off the stand 300. The device support 306 includes a wireless power source 310 configured to be in contact with the electronic device 102. In one example, the wireless power source 310 may be a Qi compatible power source or charger. Qi is an open interface standard that defines wireless power transfer using inductive charging. The wireless power source 310 may be positioned on or in the device support 306, such that the wireless power source 310 may either extend outwardly from the device support 306, as shown in FIG. 3, or be flush with the surface of the device support 306. Many other configurations are possible. While the charging unit of FIG. 3 depicts a substantially upright charging stand 300, other types of stands or charging stations may be used. For example, a flat surface such as a wireless charging pad or a charging station built into a retail display surface may also be used. When the electronic device 102 is placed on the wireless charging stand 300 as shown in FIG. 3 with the back of the device facing the wireless power source 310, power is supplied to the electronic device 102.

The wireless charging stand 300 may be intended to correspond to a particular electronic device 102. In this case, the wireless charging stand 300 may be considered the home base location for the particular electronic device 102. Thus, a base or reference profile, discussed above, may be associated with the wireless charging stand 300. When an electronic device 102 is placed on or in proximity of the wireless charging stand 300 so that power is supplied to the electronic device 102 from the wireless power source 310, the processor 104 is configured via the execution of the security monitoring instructions 116 to automatically compare the base profile of the wireless charging stand 300 to the current profile of wireless beacon devices 141-144 detected via the antenna 111. If the comparison results in a match, the electronic device 102 is placed in the correct wireless charging stand 300. If the comparison does not result in a match, the electronic device 102 is not in the correct wireless charging stand 300 and a security measure may be implemented. For instance, an alert or an alarm may sound. In another example, a message or notification may be displayed on the user interface 108 to notify the customer that the electronic device 102 in the wrong location. In yet another example, a store employee may be notified in order to assist the customer to return the electronic device 102 to its appropriate location. In this case, the store employee may have access to the memory 106, 103 of the electronic device 102 in order to retrieve the correct home base location for the electronic device 102.

In another example, a plurality of wireless charging stands 300 may correspond to, or be associated with, a base profile. For instance, as discussed above with regard to FIG. 2, a retail display table may contain multiple wireless charging stands 300. The retail display table may also have one or more wireless beacon devices 141-144 fixed thereto. In this example, the plurality of wireless charging stands 300 on the retail display table may be associated with either one of, or both of, the wireless beacon devices 141-144 on the retail display table. In this case, when an electronic device 102 is placed on or in proximity of any of the plurality of wireless charging stands 300 so that power is supplied to the electronic device 102 from the wireless power source 310, the processor 104 automatically compares the base profile associated with the plurality of wireless charging stands 300 to the current profile of wireless beacon devices 141-144 detected via the antenna 111. If the comparison results in a match, the electronic device 102 is placed in a wireless charging stand 300 on the correct retail display table. If the comparison does not result in a match, security measures as discussed above may be implemented.

Removing the electronic device 102 from the wireless charging stand 300 results in a loss of power being supplied to the electronic device 102. As discussed above, this may be a trigger event that leads to one or more security measures. For instance, the processor 104 may be configured via the execution of the security monitoring instructions 116 to, upon detection of power no longer being supplied to the electronic device 102, initiate another security measure for the electronic device 102. In one example, removing the electronic device 102 from the wireless charging stand 300 results in a first, or initial, low level security measure, such as a notification to the customer via the user interface 108 that the electronic device 102 is protected by various security protocols. This notification may be a temporary alert that disappears after a short amount of time. This notification may also inform the customer that they are free to roam the store, but that if the electronic device 102 is taken too far away from its charger stand or cradle, that additional security measures, such as alarms and device locking, may occur.

Figure 4:
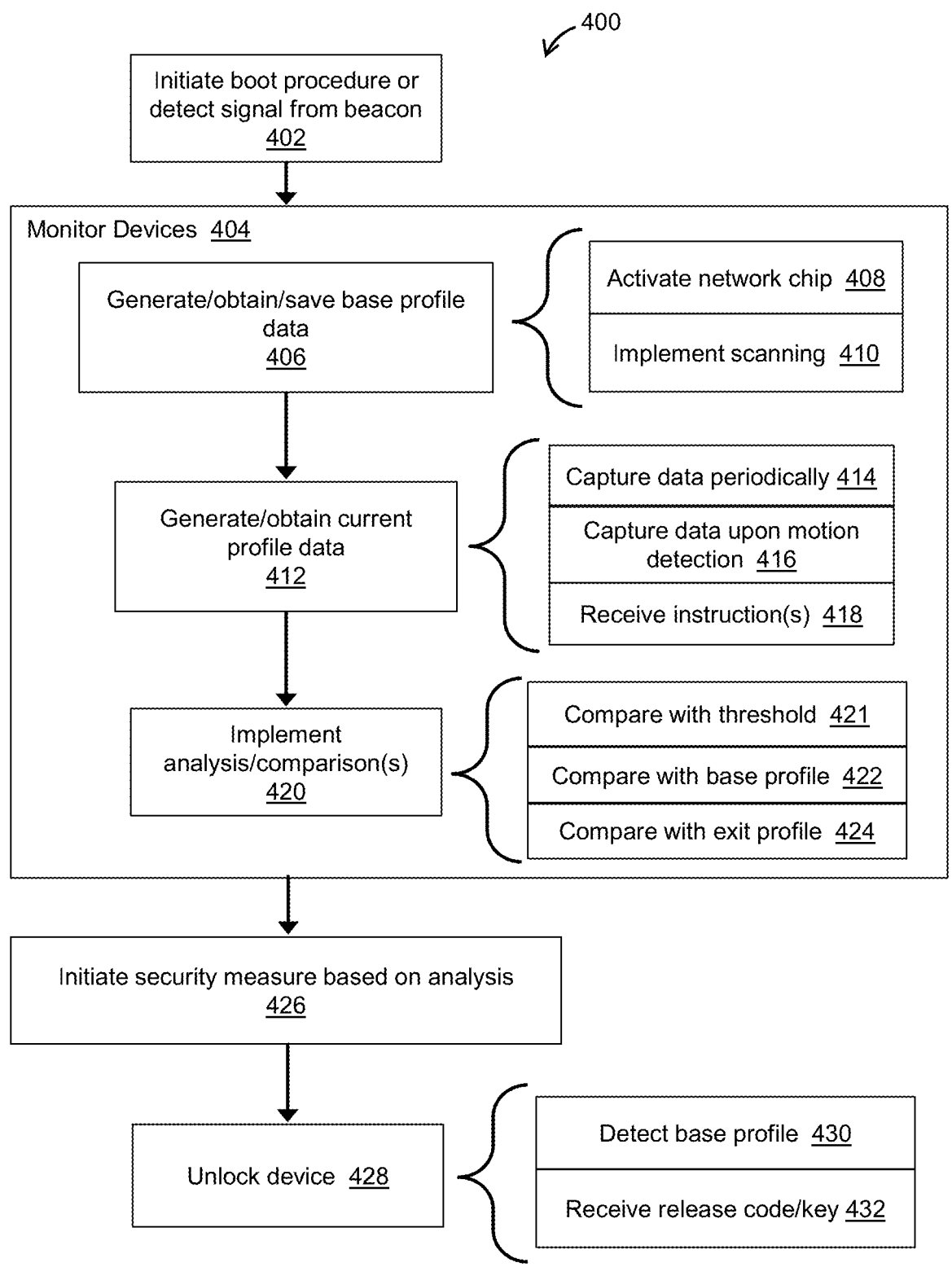
FIG. 4 is a flow diagram of a method of monitoring an electronic device on retail display in which integrated security monitoring based on beacon detection is provided in accordance with one example.

FIG. 4 is a flow diagram of a method 400 of monitoring an electronic device 102 on retail display. The method 400 is implemented by the electronic device 102 itself. For instance, the method 400 may be implemented by the processor 104 of the electronic device 102 described above in connection with FIG. 1. The characteristics of the processor 104 and electronic device 102 may vary from the examples described above.

The acts of the method 400 may be implemented in accordance with the above-described security monitoring instructions 116. The instructions 116 may be stored in any type of memory 106, 103 as described above. One or more acts of the method 400 may be implemented within a persistent or background service running on the processor 104, as described above.

The method 400 may begin with one or more acts directed to booting up the electronic device 102. For instance, the acts may be implementing an activation, startup, or restart (or reboot) of the electronic device 102. Alternatively, in another example, the method 400 may begin as soon as the antenna 111 of the electronic device 102 detects a signal from any of the wireless beacon devices 141-144. Any number of startup-related acts may be performed before security-related instructions 112 are implemented.

The method 400 includes an act 402 in which boot instructions 114 are executed, or a signal from a wireless beacon device 141-144 is detected, to initiate, in turn, execution of security monitoring instructions 116. The boot instructions 114 may be stored in a persistent memory 105 of the electronic device 102 as described above. The nature of the boot instructions 114 may vary. For instance, the boot instructions 114 may include a general or specific callout or other reference to a routine(s) or other instructions that either directly or indirectly results in the execution of the monitoring instructions 116. Alternatively or additionally, the boot instructions 114 may include instructions in addition to a callout or other reference to implement security-related tasks, such as one or more tasks related to determining whether to initiate the security monitoring.

The execution of the monitoring instructions 116 leads to an act 404 in which a plurality of wireless beacon devices 141-144 is monitored by the processor 104. Each wireless beacon device of the plurality of wireless beacon devices 141-144 is configured to broadcast a beacon signal detected or detectable via the antenna 111 of the electronic device 102. The monitoring of the act 404 may include a number of subsidiary acts directed to generating or obtaining and analyzing a current profile. In the example of FIG. 4, the act 404 includes generating or obtaining (e.g., saving and accessing) base profile data for a home base location of the electronic device 102 in an act 406. The act 406, in turn, may include activating a network chip 128 in an act 408, and implementing scanning for beacons using the antenna 111 in an act 410. The network chip 128 may be used to send data obtained by the electronic device 102 to an external network 101 or another device.

Current profile data for the profile of wireless beacon devices 141-144 is generated or obtained in an act 412. The current profile data may be captured periodically (act 414), upon motion detection (act 416), and/or upon receipt of an instruction to scan (act 418). Once the current profile data is generated or obtained, an analysis is performed in act 420. In one example, the analysis includes one or more comparisons, such as comparing the current profile to a threshold to detect whether the profile exceeds the threshold or to detect a change in the profile. In an act 422, a comparison of the current profile data with the base profile data is implemented to detect the change. Alternatively or additionally, the current profile data is compared in an act 424 with exit profile data as described above to lock the user interface upon the detection of a match.

A security measure is initiated in act 426 based on the analysis performed in act 420. For instance, in one example, upon detecting that the profile of wireless beacon devices 141-144 exceeds one or more thresholds or upon detecting a change in the profile that exceeds one or more thresholds, a security measure is initiated in act 426. For example, the user interface 108 of the electronic device 102 may be locked in an act 426. The locking may inhibit some or all of the input/output functions of the user interface 108, as described above. The locking of the device in the act 426 may include or involve generating a warning, as described above. Other security measures, as described above, may be initiated in act 426.

In act 428, the security measure may be deactivated. In one example, the electronic device 102 may be unlocked in act 428. The steps taken to unlock the electronic device 102 may vary. In some cases, the detection of the base or reference profile in an act 430 unlocks the electronic device 102. Alternatively or additionally, a release code or key is received in an act 432 to unlock the device 102. The manner in which the device 102 is unlocked may vary as described above.

The order of the acts of the above-described method 400 may differ from the example shown in FIG. 4. For instance, one or more comparison may be implemented concurrently with the capturing of further profile data. Profile data may also be received concurrently with the analysis of other, previously received profile data.

In one example of the above-described methods and devices, the profile includes data indicative of quantities of wireless beacon devices 141-144 detected, types of wireless beacon devices 141-144 detected, and signal strengths of wireless beacon devices 141-144 detected via the antenna 111, where the types of wireless beacon devices 141-144 are indicative of locations of the wireless beacon devices 141-144 relative to a location associated with an exit of a retail environment. Any number of wireless beacon devices 141-144 may be included in the profile data. During monitoring, the threshold for determining whether to initiate a security measure (i.e., lock the electronic device 102) involves predetermined signal strengths for a predetermined number and type of wireless beacon devices 141-144, where the type of wireless beacon devices 141-144 is indicative of a location of the wireless beacon devices 141-144 within a retail environment. In one example, the threshold may involve the signal strength for three or more of the wireless beacon devices 1141-144 in the profile. For example, if three or more of the wireless beacon devices 141-144 still have signal strength of greater than or equal to 70% of the level recorded in the profile data, then no security measure, such as locking, occurs. Otherwise, the electronic device 102 may be locked. In other examples, the threshold for the signal strength level may be lower or higher. The number of the wireless beacon devices 141-144 for which the signal strength threshold is applied may be lower or higher. For instance, in other cases, to avoid locking, the analysis may look to maintain four or five of the total number of wireless beacons devices above 70% of the levels in the profile data. Additional or alternative threshold-based determinations may be used.

As described above in connection with the examples shown in FIG. 2, the method 400 may use a different threshold for unlocking than for locking. In some cases, the different threshold may be determined by dynamically changing the threshold to another threshold upon initiating the security measure, generating an updated profile based on updated beacon signals of the plurality of wireless beacon devices 141-144 being detected by the antenna 111, and initiating another security measure for the electronic device 102 based on an analysis of the updated profile. For example, the analysis of the updated profile may involve comparing the updated profile of wireless beacon devices 141-144 with the other threshold and when the updated profile exceeds the other threshold, initiating another security measure. Again, this is to introduce hysteresis in the analysis.

The step of monitoring the profile of wireless beacon devices 141-144 in act 404 may involve additional steps as well. For instance, the monitoring the plurality of wireless beacon devices 141-144, and in particular the analysis of the profile of wireless beacon devices 141-144, may also involve detecting power being supplied to the electronic device 102, comparing the profile with base profile data for a home base location of the electronic device 102, and determining whether the electronic device 102 is at the home base location based on the comparison. In this case, the home base location may be a display location of the electronic device 102 within a retail environment. In another example, monitoring the plurality of wireless beacon devices 141-144, and in particular the analysis of the profile, may also involve initiating an initial security measure for the electronic device 102 upon detection of power no longer being supplied to the electronic device 102. In other words, when the electronic device 102 is removed from a charging station, an initial security measure may be implemented. As discussed above, the charging station may be wired or wireless.

In some cases, the disclosed systems, devices and methods may establish a hierarchy or priority of types of trigger events. For example, the trigger events may be given in ascending priority: on-demand (or request-based) trigger event, location-based trigger event (e.g. via global positioning or change in radiofrequency environment), power-loss trigger event, scheduled trigger event, and connectivity or communications-based (e.g. "offline") trigger event. The trigger event types may be given a priority other than the priority in the example. Resolving or ending a higher priority trigger event may also resolve any or all lower priority trigger events. When a higher priority trigger event is determined, the locking behavior (e.g. the duration of the lock, the warning or message displayed, and the alarm) may be based on the higher or highest priority trigger event. For example, where a power-loss trigger has locked a device and a location-based trigger event is determined, the message/warning is displayed, and the alarm will change according to the configuration of the power-loss trigger. Wi-Fi visibility and/or Geofence may be added as additional backup lock triggers. Wi-Fi visibility may be a local trigger (no internet needed). Geofence may require a SIM card and/or internet connection. Certain proprietary app-based or Web based device locking and geo-tracking are also still available but may require internet connection.

The above-described systems, devices and methods may be used or implemented to provide a software solution for instant theft deterrence for electronic products and devices. The disclosed systems, devices and methods may provide for data analytics and alerts regarding the location, status of, and user interactions with, electronic products and devices. Aspects of the disclosed systems, devices and methods may be implemented via, or otherwise involve, the firmware of the electronic device. Other aspects may be implemented via, or otherwise involve, a software application or other instructions running on the device. In some cases, a combination of firmware and application software may be used.

For example, the software solution may be installed in the basic input/output system (BIOS) or other boot instructions (e.g., bootloader) or other firmware of a device in order to lock and unlock the device based on one or more triggers. The software solution may also be configured to provide local and remote status, alerts and other data regarding the device. Data analytics and alerts regarding the status of and user interactions with electronic products and devices may be provided. For example, the software solutions may send time-stamped status information out to a cloud back-end such as: demo device powered/not powered status (lift and place events), demo device battery % levels, beacon battery levels, in-store (plan-o-gram) location, geolocation, and warning/alarm/lock event status. This data may all be reported using data exports, a Web-UI/dashboard, and/or using mobile apps.

By incorporating aspects of the software solution in the firmware or other persistent of the device, the software solution cannot be overcome by hard resetting the device (e.g., a hardware or factory reset). For example, during a hard reset, the core hardware components are reset to factory settings, deleting most software installed on the device. By installing the software solution in the firmware or persistent memory of the device, a hard reset of the device does not delete or otherwise remove the software solution. In some cases, a hard reset triggers a locking or benefit denial.

One or more aspects of the software solution may be installed as a software application (e.g., an app) on the device. Installation of a software application may be useful in connection with electronic devices for which the firmware is not capable of being customized. For example, a software application may be used in connection with electronic devices commercially available from Apple. In some cases, these aspects of the solution are implemented as a persistent application(s). For example, persistent applications reload or are reinstalled upon being closed or uninstalled. Additionally, in some cases, if the software application is uninstalled, the application will reinstall itself, such as using an internet, mobile or other network connection. Therefore, if a user deletes the software application, the application will be auto re-downloaded and installed on the device.

The disclosed methods and systems are well suited for implementation by, and use with, any electronic product capable of executing instructions, including any electronic devices having firmware or other persistent memory, such as laptops, computer, tablets, mobile phones, wearables, smart televisions and other computing-based consumer, commercial and/or industrial electronic products. The software solution may be implemented via any combination of firmware and software.

The disclosed devices and methods provide a software solution for immediate benefit denial of an electronic device. The benefit denial locks the device based on one or more triggers. By locking the device, the device is rendered unusable (e.g., bricked). If one or more of the triggers are no longer present, the benefit denial is removed and the device is unlocked. By using a software solution installed on the device, the security monitoring need not rely on an internet connection, key, user intervention or other connectivity to lock and unlock the device, although such elements may be optional in some cases. The use of the disclosed technologies enables a security system that requires no key as all decision are made by the use of retail digital fingerprints (i.e., visibility of many different technologies) to determine the location and state of the device.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. An electronic device configured for retail display, the electronic device comprising:
   an antenna;
   a memory in which security monitoring instructions are stored; and
   a processor configured to execute the security monitoring instructions to generate and monitor a profile of wireless beacon devices detected via the antenna by periodically capturing current profile data indicative of Bluetooth broadcast signals from the wireless beacon devices that are currently detected via the antenna, each Bluetooth broadcast signal comprising beacon identifier data, the beacon identifier data being associated with a retail site in which the device is on retail display;
   wherein the processor is further configured via the execution of the security monitoring instructions to, upon detection that the current profile data for the profile of wireless beacon devices exceeds a threshold, initiate a security measure for the electronic device, the threshold being exceeded via an inability to detect a predetermined number of the wireless beacon devices; and
   wherein the processor is further configured via the execution of the security monitoring instructions to, upon detection that the current profile data no longer exceeds the threshold or a different threshold, deactivate the security measure.

2. The electronic device of claim 1, wherein the profile comprises data indicative of quantities of wireless beacon devices detected, types of wireless beacon devices detected, and signal strengths of wireless beacon devices detected via the antenna, wherein the types of wireless beacon devices are indicative of locations of the wireless beacon devices.

3. The electronic device of claim 2, wherein the locations of the wireless beacon devices comprise locations relative to a location associated with an exit of a retail environment.

4. The electronic device of claim 1, wherein the threshold comprises predetermined signal strengths for a predetermined number and type of wireless beacon devices, wherein the type of wireless beacon devices is indicative of a location of the wireless beacon devices.

5. The electronic device of claim 1, wherein the processor is further configured via the execution of the security monitoring instructions to, upon the initiation of the security measure, dynamically change the threshold to a further threshold and, upon detection of an updated profile of wireless beacon devices that exceeds the further threshold, initiate another security measure for the electronic device.

6. The electronic device of claim 1, wherein the wireless beacon devices comprise wireless transmitters operable to broadcast data at regular time intervals.

7. The electronic device of claim 1, wherein the wireless beacon devices are not connected to an external network.

8. The electronic device of claim 7, wherein the wireless beacon devices not connected to an external network are battery powered.

9. The electronic device of claim 1, wherein:
   base profile data for a home base location of the electronic device is stored in the memory, the home base location being a display location of the electronic device within a retail environment; and
   the processor is further configured via the execution of the security monitoring instructions to, upon detection of power being supplied to the electronic device, implement a comparison of data indicative of the profile with the base profile data to detect whether the electronic device is at the home base location.

10. The electronic device of claim 1, wherein the processor is further configured via the execution of the security monitoring instructions to, upon detection of power no longer being supplied to the electronic device, initiate another security measure for the electronic device.

11. The electronic device of claim 1, wherein the processor is further configured to, upon an initial detection of the wireless beacon devices by the antenna, automatically install and store the security monitoring instructions in the memory.

12. The electronic device of claim 1, wherein:
   exit profile data is stored in the memory;
   the exit profile data is indicative of wireless beacon devices disposed at a location associated with an exit of a retail environment; and
   the processor is further configured via the execution of the security monitoring instructions to compare the profile with the exit profile data and, upon detection of a match between the profile and the exit profile data, lock a user interface of the electronic device.

13. A method of monitoring an electronic device on retail display, the method comprising monitoring, by a processor, a plurality of wireless beacon devices, each wireless beacon device of the plurality of wireless beacon devices broadcasting a beacon signal detected via an antenna of the electronic device;
   generating, by the processor, a profile based on the beacon signals of the plurality of wireless beacon devices detected via the antenna by periodically capturing current profile data indicative of Bluetooth broadcast signals from the wireless beacon devices that are currently detected via the antenna, each Bluetooth broadcast signal comprising beacon identifier data, the beacon identifier data being associated with a retail site in which the device is on retail display;
   initiating, by the processor, a security measure for the electronic device based on an analysis of the current profile data for the profile, the analysis indicating that the current profile data exceeds a threshold, the threshold being exceeded via an inability to detect a predetermined number of the wireless beacon devices; and
   deactivating, by the processor, the security measure upon detection that the current profile data no longer exceeds the threshold or a different threshold.

14. The method of claim 13, wherein the profile comprises data indicative of quantities of wireless beacon devices detected, types of wireless beacon devices detected, and signal strengths of wireless beacon devices detected via the antenna, wherein the types of wireless beacon devices are indicative of locations of the wireless beacon devices relative to a location associated with an exit of a retail environment.

15. The method of claim 13, wherein the analysis comprises comparing the profile to a threshold, the threshold comprising predetermined signal strengths for a predetermined number and type of wireless beacon devices, wherein the type of wireless beacon devices is indicative of a location of the wireless beacon devices within a retail environment.

16. The method of claim 15, further comprising:
upon initiating the security measure, dynamically changing the threshold to another threshold;
generating, by the processor, an updated profile based on updated beacon signals of the plurality of wireless beacon devices detected via the antenna; and
initiating, by the processor, another security measure for the electronic device based on an analysis of the updated profile.

17. The method of claim 13, wherein the analysis of the profile comprises:
detecting power being supplied to the electronic device;
comparing the profile with base profile data for a home base location of the electronic device, the home base location being a display location of the electronic device within a retail environment; and
determining whether the electronic device is at the home base location based on the comparison.

18. The method of claim 13, wherein the analysis of the profile comprises:
upon detection of power no longer being supplied to the electronic device, initiating an initial security measure for the electronic device.

19. A system for retail security monitoring, the system comprising:
an electronic device on retail display; and
a plurality of wireless beacon devices, each wireless beacon device of the plurality of wireless beacon devices broadcasting a respective signal at regular time intervals;
wherein the electronic device comprises:
an antenna;
a memory in which security monitoring instructions are stored; and
a processor configured to execute the security monitoring instructions to generate and monitor a profile of the plurality of wireless beacon devices detected via the antenna by periodically capturing current profile data indicative of Bluetooth broadcast signals from the wireless beacon devices that are currently detected via the antenna, each Bluetooth broadcast signal comprising beacon identifier data, the beacon identifier data being associated with a retail site in which the device is on retail display;
wherein the processor is further configured via the execution of the security monitoring instructions to, upon detection of a change in the current profile data for the profile of the plurality of wireless beacon devices that exceeds a threshold, lock a user interface of the electronic device, the threshold being exceeded via an inability to detect a predetermined number of the wireless beacon devices; and
wherein the processor is further configured via the execution of the security monitoring instructions to, upon detection that the current profile data no longer exceeds the threshold or a different threshold, deactivate the security measure.

* * * * *